United States Patent

[11] 3,584,181

| [72] | Inventors | Tadashi Nemoto<br>Takahagi-shi;<br>Kiyoshi Watanabe; Kazuei Saito, Hitachi-shi, all of, Japan |
|---|---|---|
| [21] | Appl. No. | 828,978 |
| [22] | Filed | May 29, 1969 |
| [45] | Patented | June 8, 1971 |
| [73] | Assignee | Hitachi, Ltd. and Hitachi Metals, Ltd. Tokyo, Japan |
| [32] | Priority | May 31, 1968 |
| [33] | | Japan |
| [31] | | 36746 |

[54] METHOD OF ARC WELDING FOR HARD FACING
14 Claims, 9 Drawing Figs.

[52] U.S. Cl. ............................ 219/76, 219/123, 219/128
[51] Int. Cl. ............................ B23k 9/04, B23k 9/08
[50] Field of Search ............................ 219/128, 123, 76

[56] References Cited
UNITED STATES PATENTS

| 2,046,117 | 6/1936 | Guest | 219/123 |
| 2,152,194 | 3/1939 | Jones | 219/123 |
| 2,920,183 | 1/1960 | Greene | 219/123 |

*Primary Examiner*—J. V. Truhe
*Assistant Examiner*—L. H. Bender
*Attorney*—Craig, Antonelli, Stewart & Hill

ABSTRACT: In welding for providing a metallic work with hard facing, in which an electric arc is maintained between a consumable tape electrode and said metallic work, the arc being submerged in powder of flux, while the surface of said metallic work is being gradually coated with the molten electrode material; the improvement comprises the application of a magnetic field during the welding process to eliminate the malignant effect of a circular magnetic field around the electrode caused by the welding current and thereby to obtain a uniformly coated surface.

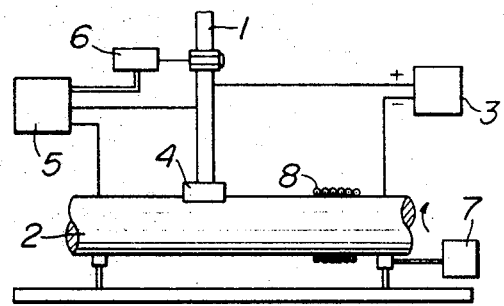
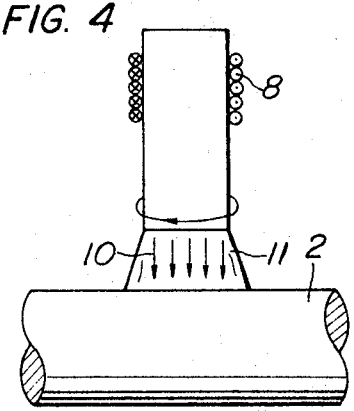
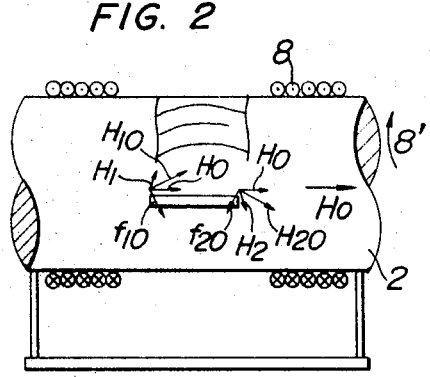
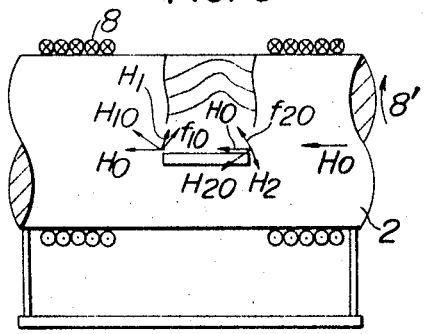
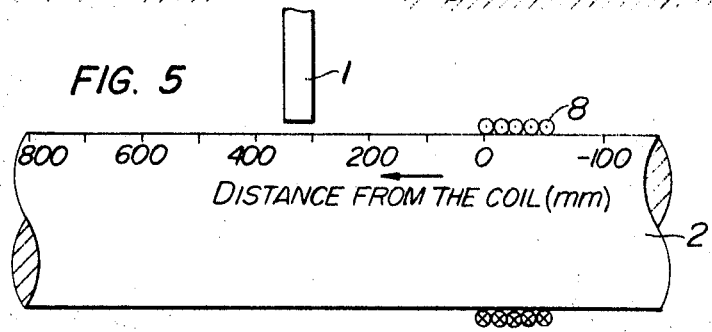

METHOD OF ARC WELDING FOR HARD FACING

This invention relates to a welding method, particularly a method of submerged arc welding for providing a metallic work with a hard facing.

Reinforcement of the surface of a soft steel member with a layer of a hard steel is usually achieved by means of buildup welding. Sometimes, the buildup welding, that is, hard facing welding is adopted for improving the resistivity of a structural member to corrosion or other harms.

The hard facing welding is ordinarily performed by means of a submerged arc welding, in which an electric arc is maintained between a consumable electrode and a work to be faced, the arc being enclosed in granular flux placed on said work, and the tip of the electrode, the flux and the surface of said work being melted by the heat of the arc to form a layer joined with the surface of said work. During the welding process, the flux is continuously fed so as to enclose the arc and thereby to screen the arc from the atmosphere. The fused flux exhibits an effective refining action and comes up to the surface of the molten metal eventually to become easily removable slag. The welding is carried out usually in a fully automatic manner, with either an AC or DC power supply. An advantage of the submerged arc welding is that it can be performed with a large electric current. That means a high melting rate of the consumable electrode and accordingly a well-joined layer of the buildup metal even for a work having considerable thickness.

Generally, however, a consumable electrode is made in the shape of a rod. Naturally, it takes a very long time and large expense to provide hard facing over a work of large size using an electrode of such a shape. A few attempts have been made to reshape the consumable electrode into a tape or band in order to cut the welding time and the cost.

However, unexpected new problems have arisen from the above reshaping of the electrode to hamper the use of the tape electrode. One of the problems is the unevenness of the surface of the facing obtained; and the other problem is the fact that an undercut often appears adjacent to the edge of the molten metal during the welding and traps a part of the slag which should be removed, thus degenerating the quality of the facing. Therefore, if a tape electrode is used, additional processes are required for removing the unevenness by means of a grinding machine, or for complementing the undercut with a buildup welding before continue the facing welding. Thus, the tape electrode has brought about no practical success in a saving of the operation time and cost.

Exact detail of the causes of the above undesirable effects of the tape electrode have not yet been made clear, though it has been vaguely known that they are due to a magnetic effect of the welding current or the so-called magnetic flow action.

The present inventors, after various tests and investigations, have clarified the cause of the defective results due to the tape electrode. That is: the welding current produces a circular magnetic field around the tape electrode, the direction of the field being determined according to "Ampere's corkscrew rule"; and an electromagnetic force is produced between the circular magnetic field and the welding current, the direction of the force being determined by "Fleming's left-hand rule." As this force acts on the molten metal, the molten metal is dragged by the electromagnetic force. This causes the unevenness in the deposited metal; and further, the work is undercut by the heat of the arc at a portion adjacent to the edge of the bead in the opposite side from the direction of the movement of the molten metal.

The present inventors have confirmed that a magnetic field appropriately applied to the work or the electrode, other than the magnetic field due to the welding current, exercises a significant influence on the arc as well as on the molten metal. For example, the irregularity in the shape of bead and the unevenness of the surface of the deposited metal can be eliminated by applying an appropriate magnetic field to the work or the electrode. Further, the magnetic field prevents the occurrence of the undercut at an edge of bead which is inevitable if the magnetic field does not exist.

The above-mentioned magnetic field can be generated by magnetizing coils provided on the work or on the electrode. However, it should be noted that the intensity of said magnetic field must be higher than that of the circular magnetic field due to the welding current.

The main object of this invention is to provide an improved method of submerged arc welding for providing hard facing on a work.

Another object of this invention is to provide a welding method by which a hard facing having a smooth surface is obtained.

A further object of this invention is to provide a welding method for providing a hard facing in which advantages of the submerged welding are effectively utilized.

A still further object of this invention is to provide a welding method for providing a hard facing which can be applied effectively to steel works having curved surfaces.

In order to achieve the above objects, this invention provides a submerged arc welding method for hard facing, in which an electric arc is maintained between a consumable tape electrode and a work to be faced, the arc being submerged in the flux material, while the tip portion of said consumable tape electrode is being melted off and the molten metal off said tape electrode is forming the hard facing on the surface of said work, characterized in that an electromagnetic force is applied to said molten metal even and smooth.

Though it is needless to say that the method of this invention is advantageously applied to materials having high permeability such as soft steel or chrome steel, it has been proved that this method is effectively applicable even to materials of relatively low permeability.

Hereunder, features and merits of this invention will be described in detail in connection with embodiments of the invention and with reference to the accompanying drawings in which:

FIG. 1 is a schematic diagram of an arrangement in which the method of this invention is utilized;

FIGS. 2 and 3 are schematic diagrams for explaining the principle of this invention;

Figure 6:
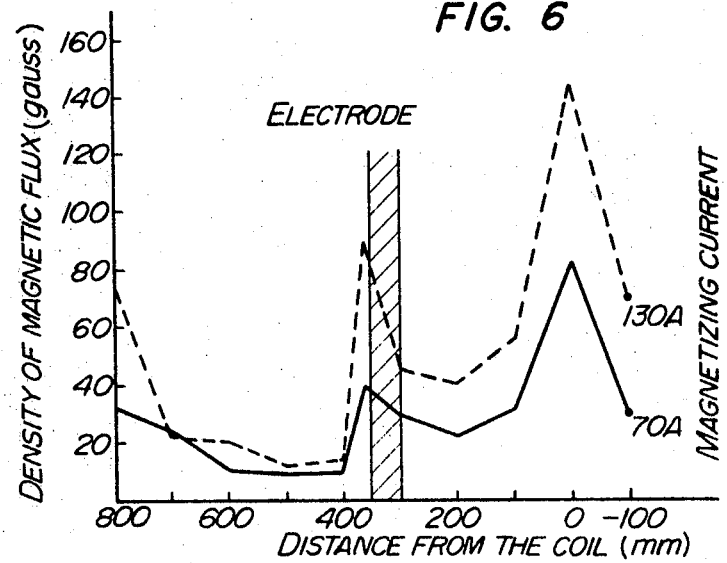
Figure 7:
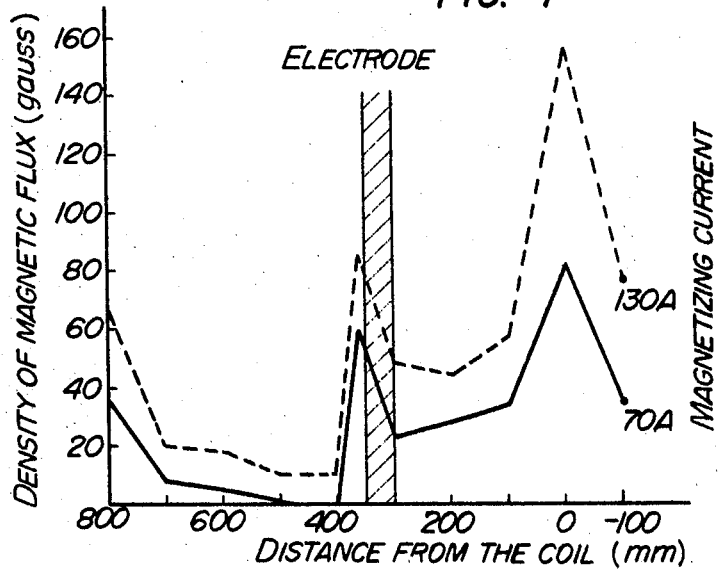

FIG. 3 showing an adverse arrangement;

FIG. 4 shows a special arrangement for practicing the method of this invention;

FIG. 5 shows an arrangement including a tape electrode, a rod-shaped work and a magnetizing coil;

FIGS. 6 and 7 are diagrams showing the distribution of magnetic flux density along the surface of the rod-shaped work shown in FIG. 5;

FIG. 8 is a sectional view of a typical bead obtained according to this invention; and FIG. 9 is the corresponding view when the magnetic field is removed.

Referring to FIG. 1 which shows an arrangement for practicing the method of this invention, reference numeral 1 indicates a consumable tape electrode, 2 a rod-shaped work on which hard facing is to be deposited, 3 a DC welding machine, 4 a distributor containing granular flux material, 5 a voltage regulator, 6 a motor for feeding the consumable tape electrode, 7 a driving means for rotating the work, and 8 a magnetizing coil.

In the above arrangement, an electric arc is initiated between the consumable tape electrode 1 and the work 2 by passing an electric current through said electrode 1 and said work 2. The granular flux material is fed around the arc to screen it from the atmosphere, and at the same time, a magnetic field is imparted by means of the magnetizing coil 8. The work 2 is rotated around its axis while the electrode 1 is slowly moved in the axial direction of the work 2, a constant space being maintained between the end of the electrode 1 and the surface of the work 2. Thus, the molten metal from the consumable tape electrode 1 is continuously deposited on the work 2 in a spiral manner.

Width of the consumable tape electrode must be not more than 75 mm. If it is broader, not a single but several arcs will occur causing corresponding plurality of heated spots along the width and will result in an uneven surface of the deposited hard facing, which cannot be prevented even with the method of this invention.

Thickness of the tape electrode must be not more than 1 mm. To be exact, this requirement is related to the width of the electrode. If it is thicker, more than one arc are apt to occur in the direction of the thickness, thus obstructing uniform melting of the electrode. Further, a consumable tape electrode as thick as 1 mm. or more is not flexible enough to be wound in a coil as is a usual method for continuous feeding of the electrode. Therefore, dimensions of the tape electrode are limited to 75 mm. or less in thickness and 1 mm. or less in width.

It is preferable that the value of the magnetizing force due to the magnetizing coil 8 is approximately a value represented by (welding current ±300) AT/m. If it is smaller than (welding current−300)AT/m., the effects of the circular field due to welding current will not be overcome and an uneven surface will be produced. On the other hand, a greater magnetizing force than (welding current+300) AT/m. will only result in a surface having similar but reversed irregularity.

In the welding, if the work 2 is suddenly heated by the arc, it often causes a flaw in the deposited metal. Therefore, the work 2 is usually preheated, the appropriated preheating temperature being 300—400° C.

Further, it is preferable to anneal the hard facing after the welding to remove the residual stress. For example, in the hard facing of stainless steel on a roll of soft steel, the residual stress in the facing is considerably removed by maintaining the roll at 700° C. for about 5 hours after the welding and then gradually cooling it to room temperature.

An appropriate welding speed is 200 to 350 mm./min., either the work 2 may be fixed and the electrode 1 be moved or vice versa. If the speed is lower than 200 mm./min., the work 2 will be excessively melted and further, uniform thickness of the facing will not be maintained. While, if the speed is higher than 350 mm./min., the thickness of the hard facing will become insufficient.

FIG. 2 shows a typical disposition of the magnetizing coil for producing the above-mentioned magnetic field. The present inventors have found that when the work 2 is rotated in the direction of arrow 8′, the direction of the magnetization must be as indicated by arrow $H_0$ in FIG. 2 in order to obtain a uniform facing. If the direction of the magnetization is reversed as shown in FIG. 3, a smooth surface will not be obtained. The reason is inferred as follows:

In FIGS. 2 and 3, the magnetic field $H_0$ due to the magnetizing coil 8 is added to the circular magnetic field due to the welding current. Assuming that intensities of the circular magnetic field at two points optionally taken on the surface of the work 2 and adjacent to the arc are $H_1$ and $H_2$ respectively, the addition of the field represented by $H_0$ to the circular field represented by $H_1$ and $H_2$ produces a resultant magnetic field represented by $H_{10}$ or $H_{20}$. The electromagnetic force acting on the welding current is represented by $f_{10}$ or $f_{20}$ which are perpendicular to $H_{10}$ or $H_{20}$ respectively. If the above procedure for determining the resultant field is carried out at several points around the arc, it will become clear that the welding current is dragged in the direction opposite to the direction of rotation of the work 2 in the case of FIG. 2. On the other hand, in the case of FIG. 3, the welding current is dragged in the direction of the rotation. It is essential in the welding operation to apply the magnetic field to the work 2 in the direction as shown in FIG. 2.

In actual welding, the welding current in or adjacent to the work 2 has horizontal components to be acted on by a vertical magnetic field. It has been proven that even a magnetization of the electrode by the coil 8 as shown in FIG. 4 shows considerably good results.

In the hitherto described embodiments of this invention, a means for generating a magnetic field is provided adjacent to the path of the welding current, so that a magnetic field resulting from the combination of the above-mentioned magnetic field and the circular magnetic field due to the welding current acts on the welding current in the molten metal and the thus caused electromagnetic force serves to keep the molten metal flat.

However, the objects of this invention can be attained even without the aid of such a magnetic field generating means, if the path of the welding current is designed so that the electromagnetic force due to the welding current makes the molten metal flat or that said electromagnetic force screens the molten metal from the circular field due to the welding current.

Hereunder, several examples of the application of the method of this invention will be shown.

EXAMPLE 1

Hard facing welding was performed on a cylindrical rod of soft steel which was 250 mm. in diameter and 1,000 mm. in length, using a consumable electrode of 13 percent chrome steel in the form of a tape 0.4 mm. thick and 50 mm. wide, a magnetizing coil being wound on the soft steel rod at a position 300 mm. apart from the electrode. FIG. 5 shows the relative positions between the tape electrode 1, the rod or work 2 and the magnetizing coil 8. The work 2 was preheated up to 350° C. and then the welding was performed at a welding speed (that is, a rotating speed of the work 2) of 200 mm./min. Number of turns of the coil was 10 and the magnetizing current was 70 a., which corresponds to an intensity of magnetic field of 700 AT/m. The welding current was 600 a. and the arc voltage was 25 v. After the welding, the rod was heated at 700° C. for 5 hours and then left to cool down in the oven for annealing. The resultant facing had a smooth surface without any irregularity in its thickness.

Further, a test welding was performed with the same arrangement as above except that the magnetizing current was increased to 130 a. This time, an undercut was made at the edge of the bead in the side near to the coil 8, and the deposited metal had a ridge in the side opposite to that where a ridge would be produced if the magnetic field was not applied. This indicates that a magnetic field intensity as high as 1,300 AT/m. is too high to be desirable for a welding current of 600 a.

FIG. 6 shows a distribution of the magnetic flux along the surface of the work 2 in the arrangement shown in FIG. 5 when the welding current is 600 a. The indicated density of magnetic flux is the component in the axial direction of the work. It should be noted that the flux density is outstandingly high at the position of the electrode, though it is highest, of course, at the position of the magnetizing coil 8. In FIG. 6, the peaks are seen at the border of the position of the electrode. However, it should be born in mind that the measurement has not been performed at the center position of the electrode because of the difficulty of the test and that actual peaks would presumably be found at the center position.

Further, similar test weldings were performed with a welding current of 800 a. Hard facing welding with a magnetizing current of 70 a. resulted in a smooth facing without any irregularity or undercut. On the other hand, the welding with a magnetizing current of 130 a. produced an undercut at the edge of bead in the side near to the coil 8 and a ridge in the opposite side of the bead, though they were not so significant as in the previous test welding in which the welding current was 600 a.

FIG. 7 shows a distribution of the magnetic flux similar to that shown in FIG. 6, except that the welding current is 800 a. FIG. 7 also indicates that each flux distribution has a peak at the position of the electrode. This means that an appropriate magnetic field is provided around the electrode to suppress the bad effect of the circular magnetic field due to the welding current.

EXAMPLE 2

The hard facing welding was performed on a cylindrical rod of soft steel which was 250 mm. in diameter and 1,000 mm. in length, using a consumable electrode of 18-8 stainless steel which was 0.4 mm. in thickness and 50 mm. in width, said electrode being positioned at the midportion of the length of the rod, and a magnetizing coil whose number of turn was 10 being wound on the soft steel rod at a position 300 mm. apart from the electrode. The magnetizing coil was energized with a current of 70. A welding arc of 700 a. and 25 v. was maintained between the the electrode and the work while flux material was being fed around the arc. The work was rotated at a speed of 200 mm./min., the distance between the electrode and the work being kept at 40 mm. No preheating was given to the work, and after the welding, the rod was heated at 700° C. for 5 hours. Then, it was left to cool down in the oven. The resultant facing was found to have an even thickness and a smooth surface, and no undercut was produced in the work, as shown in FIG 8.

On the other hand, a reference welding which was performed in a similar manner but without applying the magnetic field, resulted in an uneven surface of the facing and an undercut in the work as shown in FIG. 9.

EXAMPLE 3

Hard facing welding was performed using the same work and the same electrode as those in example 2, but a magnetizing coil of six turns (magnetizing force of 420 AT/m.) being wound on the electrode instead of the work. A magnetizing current of 70 a. was caused to flow through the coil in such a direction as to produce a magnetic field directing from the electrode to the work. A welding arc of 700 a., 25 v. was maintained while flux material was being fed around the arc. The work was rotated at a speed of 200 mm./min., the distance between the electrode and the work being kept at 40 mm.

The resultant facing was smooth and even.

EXAMPLE 4

A consumable electrode of stainless steel 0.8 mm. thick and 75 mm. wide was positioned at the midportion of a cylindrical rod of 13 percent chrome steel 300 mm. in diameter and 1,000 mm. in length, with the end of the electrode 40 mm. apart from the surface of the rod. A magnetizing coil of 10 turns was wound on the rod at a position 300 mm. apart from the electrode to provide a magnetic field in the direction as shown in FIG. 2. Before starting the welding, the rod was heated up to 350° C. and kept at that temperature for 10 min. Then, the welding arc was started and maintained at 700 a., 25 v., while the magnetizing coil was energized by a current of 70 c. and the rod was rotated at a speed of 200 mm./min. During the welding, flux material was kept to be fed around the arc. After the welding, the rod was heated at 700° C. for 5 hours and then left to cool in the oven.

The resultant facing was smooth and even, showing no flaw. Bead also showed no irregularity.

EXAMPLE 5

Hard facing welding with 18-8 stainless steel was executed on a soft steel plate 50 mm. thick, 300 mm. wide and 1,000 mm. long in the following manner.

A consumable electrode of 18-8 stainless steel tape 0.8 mm. thick and 75 mm. wide was supported above the surface of soft steel plate with a space of 40 mm. therebetween and near one end of the plate. The electrode was provided with a magnetizing coil of 10 terms thereon at a position 300 mm. apart from the end of the electrode, and a magnetizing current of 60 a. was caused to flow through the coil in a manner that the produced magnetic field was directed from the electrode to the plate. A welding arc of 600 a., 25 v. was maintained, flux material being fed around the arc, while the electrode was moved along the surface of the plate at a speed of 200 mm./min. After the welding, the plate was maintained at a temperature of 700° C. for 5 hours and then left to cool in the oven for annealing.

The thus obtained facing was found to have a uniform thickness over the whole surface and to have no flaw, and the bead also had no irregularity.

What we claim is:

1. A method of submerged arc welding for hard facing, in which an electric arc is maintained between a consumable tape electrode and a work to be faced, the arc being submerged in flux material, while the tip portion of said consumable tape electrode is being melted off and the molten metal of said tape electrode is forming the hard facing on the surface of said work, characterized in that an additional magnetic field through said electrode and said work is supplied in the direction from said electrode to said work so as to produce a resultant electromagnetic force which makes the surface of said molten metal even and smooth.

2. A welding method as defined in claim 1, wherein said electromagnetic force is produced by an interaction between the welding current in said molten metal and a magnetic field which is a combination of the magnetic field due to the welding current and a magnetic field due to a magnetizing means provided in the vicinity of the path of the welding current.

3. A welding method as defined in claim 2, wherein said electromagnetic force has at least a component in the direction opposite to that of the proceeding of the welding.

4. A welding method as defined in claim 2, wherein said magnetizing means comprises a coil of a plurality of turns and the magnetizing force due to said magnetizing means is in a range expressed by (welding current±300) AT/m.

5. A welding method as defined in claim 2, wherein said consumable tape electrode is not more than 75 mm. in width and not more than 1 mm. in thickness.

6. A welding method as defined in claim 2, wherein the welding speed is 200 to 350 mm./min.

7. A welding method as defined in claim 2, wherein the work is preheated at a temperature between 300° C. and 400° C. and is annealed after the welding.

8. A welding method as defined in claim 4, wherein said coil is wound on the work.

9. A welding method as defined in claim 4, wherein said coil is wound on said consumable tape electrode.

10. A welding method as defined in claim 1, which is adapted to a work having a flat or curved surface.

11. A method of submerged arc welding for providing a metallic work with a hard facing, comprising the steps of:
providing a work to be faced and a consumable tape electrode therefor, said electrode being fed in a direction substantially perpendicular to the portion of the surface of said work to be welded;
establishing and maintaining an electric arc between said consumable tape electrode and said work, said work having a circular magnetic field established therein by the welding current applied thereto and said arc being submerged in flux material, while the tip portion of said consumable tape electrode is being melted off and the molten metal of said tape electrode is forming a hard facing on the surface of said work; and
applying through said electrode and said work, a magnetic field in addition to said circular magnetic field, in a direction from said electrode toward said work, thereby providing a resultant electromagnetic force which makes the surface of said molten metal even and smooth.

12. A method according to claim 11, further including the step of rotating said work with respect to said tape electrode.

13. A method according to claim 12, wherein said step of rotating includes rotating said work at a speed of 200 to 350 mm./min.

14. A method according to claim 13, further including the step of preheating said work to a temperature between 300°C. and 400° c.